UNITED STATES PATENT OFFICE.

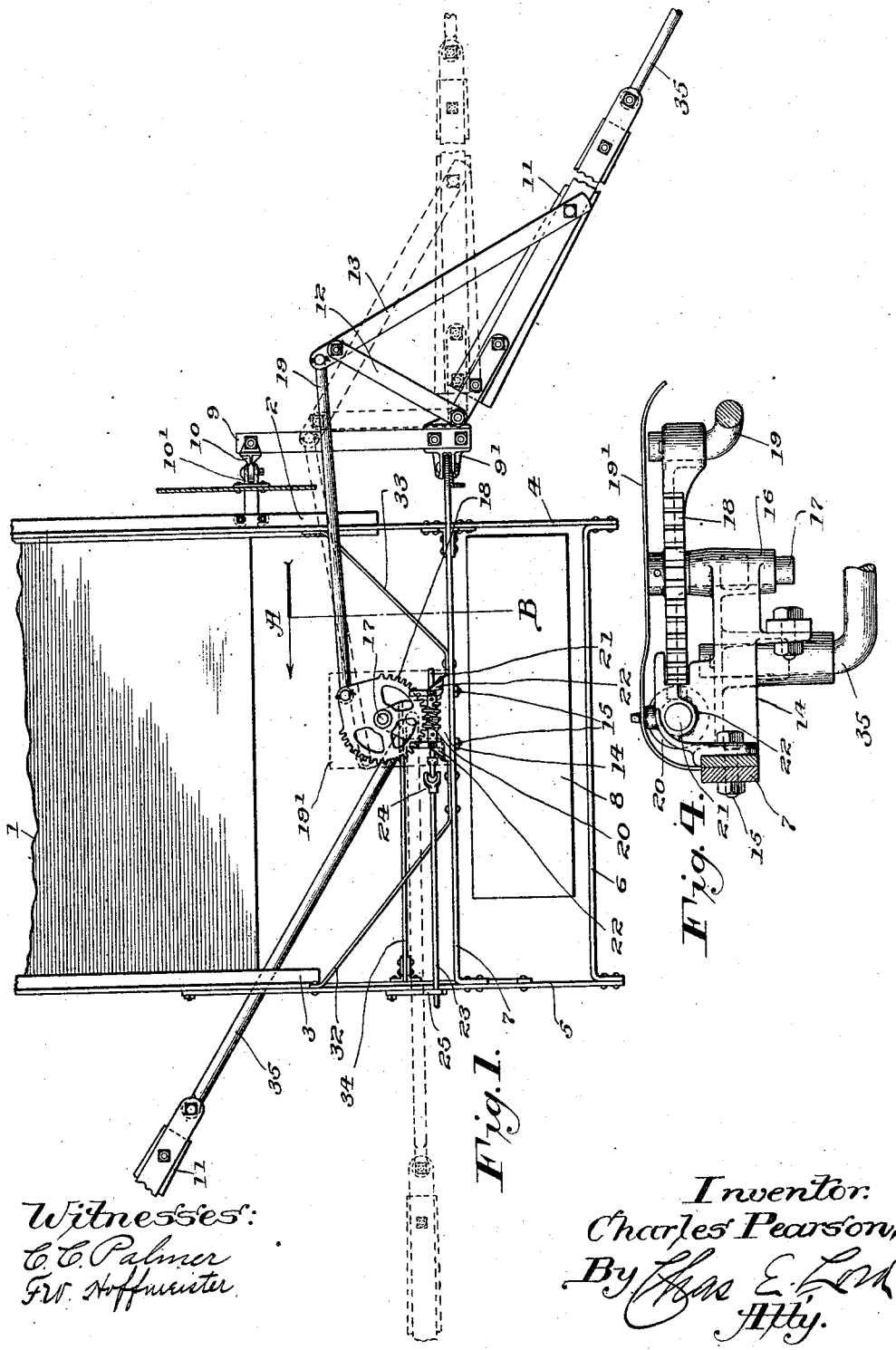

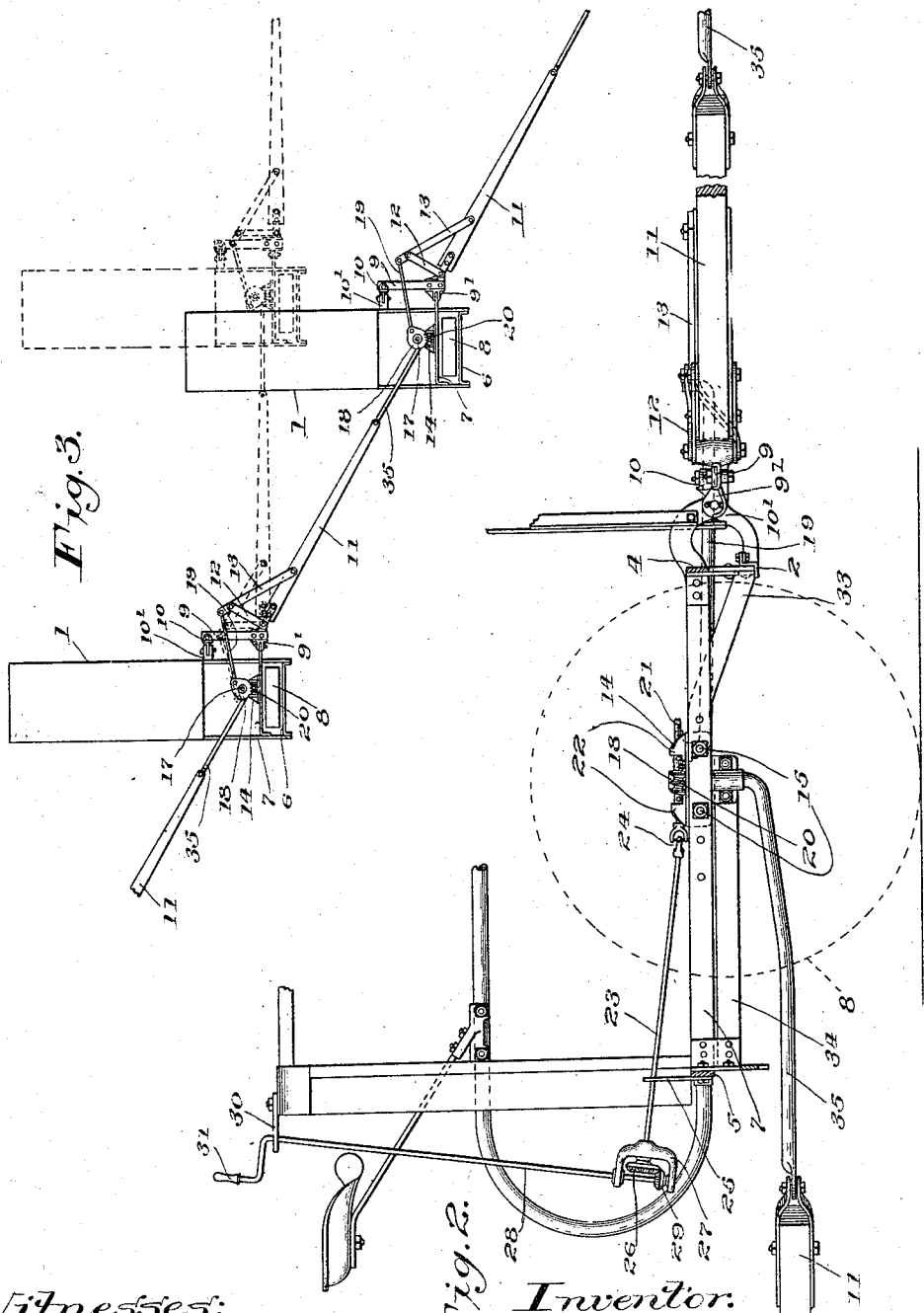

CHARLES PEARSON, OF CHICAGO, ILLINOIS, ASSIGNOR TO INTERNATIONAL HARVESTER COMPANY OF NEW JERSEY, A CORPORATION OF NEW JERSEY.

TANDEM DRAFT CONNECTION FOR HARVESTERS.

1,159,988. Specification of Letters Patent. Patented Nov. 9, 1915.

Application filed May 1, 1913. Serial No. 764,926.

*To all whom it may concern:*

Be it known that I, CHARLES PEARSON, a citizen of the United States, residing at Chicago, in the county of Cook and State of Illinois, have invented certain new and useful Improvements in Tandem Draft Connections for Harvesters, of which the following is a full, clear, and exact specification.

My invention relates to an improved draft mechanism whereby a series of grain harvesters or other implements may be connected together in tandem relation and drawn forward by a single source of power, as a traction engine, to which the forward machine of the series is connected, and consists in providing draft connections between the different units and between the series and the source of power that may be manipulated by the operator upon the machine in a manner to control the line of advance of one machine independent of the others, whereby a greater or less width of swath may be cut by either unit of the series, or the machines may be controlled in a manner to trail one directly behind the other, or at any desired degree of offset relation.

The object of my invention is to provide a draft mechanism of the character indicated that may be controlled in a simple and positive manner for the purpose described, strong in construction and efficient in operation. I attain these objects by means of mechanism, one embodiment of which is illustrated in the accompanying drawings, in which—

Figure 1 represents a top plan view of my invention as applied to the frame of a harvester; Fig. 2 is a side elevation of Fig. 1; Fig. 3 is a top plan view on a reduced scale of the mechanism and designed to illustrate the manner of connecting a plurality of harvesters in tandem relation; and Fig. 4 an enlarged front elevation of part of the controlling mechanism along line A—B of Fig. 1.

The same reference numerals designate like parts throughout the several views.

1 represents the grain platform of a harvester, including a front frame member 2 and a rear member 3.

4 represents the front member of the wheeled frame having the grainward end thereof secured to the member 2; 5 the rear member of the wheeled frame having the grainward end thereof secured to the rear member 3 of the grain platform.

6 represents a longitudinally arranged wheeled frame member at the stubbleward side thereof, and 7 a similar member spaced apart therefrom toward the grainward end. 8 represents the traction carrying wheel journaled in bearings carried by the frame members 6 and 7 in any of the well-known ways.

9 represents a bar having one end thereof pivotally connected with a fixed part of the wheeled frame by means of a bracket member $9^1$, and the opposite end with a bracket member 10 secured to the front member 2 of the grain platform by means of a bracket member $10^1$, and arranged substantially parallel with the front of the machine in a manner permitting a tilting movement of the harvester relative to the bar.

11 represents a draft tongue having the rear end thereof pivotally connected with the bracket $9^1$ in a manner permitting the tongue to swing laterally relative to the line of draft of the machine.

12 represents a bar having one end connected with the tongue, preferably coaxially with the pivotal connection thereof, and arranged at right angles therewith and having the opposite end thereof secured to the rear end of a brace member 13, the brace member extending forwardly and laterally and having the front end thereof secured to the draft tongue; the bar 12 and brace member 13 being, in effect, an integral part of the draft tongue, the function thereof being to increase the width of the rear end of the draft tongue grainward from the pivotal connection thereof with the bracket member $9^1$.

14 represents a bracket member secured to the wheeled frame member 7 intermediate the ends thereof by means of the bolts 15, and in substantially the same vertical plane as the axis of the traction wheel 8, and provided with a vertically arranged journal bearing 16 in which is journaled a stem 17, having secured to the upper end thereof a segmental worm wheel 18 that is operatively connected with the rear end of the brace member 13 by means of a link 19; the gear mechanism being shielded by means of a plate $19^1$.

20 represents a worm engaging with the wheel 18 and secured to the shaft 21 arranged in the direction of the line of draft of the machine, and journaled in laterally extending bearing members 22 integral with the bracket member 14, the rear end of the shaft 21 being operatively connected with the front end of a shaft 23 by means of a universal coupling mechanism 24; the rear end of shaft 23 being journaled in a bracket member 25 secured to the frame of the harvester and having secured thereto a bevel gear wheel 26.

27 represents a yoke member mounted upon the rear end of shaft 23 and in which is journaled the lower end of a vertically arranged shaft 28, having secured thereto a bevel pinion 29 engaging with the gear wheel 26, the upper end of said shaft being journaled in a bracket member 30 secured to the harvester frame and having integral therewith a crank member 31 within convenient reach of the operator, whereby the angular relation of the draft tongue and harvester may be readily controlled by a manipulation of the shafts 28 and 23, the worm 20, the segmental wheel 18 and the connecting link 19.

32 represents a supplemental wheeled frame member having the forward end thereof secured to the frame member 7 and extending rearward and grainward has the rear end thereof secured to the rear members 3 and 5 of the grain platform and wheeled frame, respectively, and 33 represents a similar member having the rear end thereof secured to the wheeled frame member 7 and extending forward and grainward has the forward end secured to the front members 2 and 4 of the grain platform and wheeled frame, respectively, the function of the members 32 and 33 being to resist a tendency of the draft force to distort the wheeled frame and the grain platform.

For the purpose of giving additional support to the bracket member 14 a bar 34 is provided having the front end thereof secured to bracket 14 and its rear end to the rear member 5 of the wheeled frame and disposed parallel with the wheeled frame member 7.

35 represents a draft link having its front end pivotally connected with the bracket 14 in the same vertical plane as the axis of the traction wheel for the purpose of preventing a distortion of the wheeled frame and grain platform by the draft force when several machines are drawn in tandem relation; the rear end of the link 35 being adapted to have a vertical pivotal connection with the front end of a second draft tongue and permitted to have a free lateral swinging movement to accommodate itself to the line of draft of the machine.

While I have in this application described one embodiment which my invention may assume in practice, it is to be understood that the form shown is used for purposes of illustration and may be modified without departing from the spirit of the invention.

What I claim as my invention, and desire to secure by Letters Patent, is:

1. In a tandem draft connection, a machine frame, a traction wheel mounted in said frame, a draft tongue pivotally connected with said frame, and a draft link having the front end thereof pivotally connected with said frame substantially in line with the axis of said wheel in a manner permitting the rear end thereof to swing freely laterally relative to the line of draft.

2. In a tandem draft connection, a machine frame, a traction wheel mounted in said frame, a draft tongue pivotally connected with said frame, a draft link having its front end pivotally connected with said frame substantially in line with the axis of said wheel in a manner permitting the rear end thereof to swing freely laterally relative to the line of draft, and a second draft tongue having its front end pivotally connected with the rear end of said draft link.

3. In a tandem draft connection, a machine frame, a traction wheel mounted in said frame, a draft tongue having one end pivotally connected with said frame, means for varying the angular relation of said tongue and frame relative to the line of draft, a draft link having the front end thereof pivotally connected with said frame substantially in line with the axis of said wheel in a manner permitting the rear end thereof to swing freely laterally relative to the line of draft, and a second draft tongue having its front end pivotally connected with the rear end of said draft link.

4. In a tandem draft connection, a machine frame, a draft tongue provided with a relatively wide rear end having one side thereof pivotally connected with said frame, means mounted upon said frame in rear of the axis of said tongue and operatively connected with the opposite side of the rear end of said tongue, said means being operative in a manner to control the angular relation between said tongue and frame relative to the line of draft, and a draft link having the front end thereof pivotally connected with said frame in rear of the axis of said tongue and adapted to swing freely laterally relative to the line of draft.

5. In a tandem draft connection, a machine frame, a draft tongue having a pivotal connection with said frame, a bar having one end thereof secured to the rear end of said tongue and extending laterally therefrom, a second bar having its rear end secured to the opposite end of said laterally extending bar and inclined laterally and forward and having its forward end secured to said tongue, means mounted upon said frame in rear of the axis of said tongue and operatively connected with one of said bars, said means being operative in a manner to control the angular relation between said tongue and frame relative to the line of draft, and a draft link having the front end thereof pivotally connected with said frame in rear of the axis of said tongue and adapted to swing laterally relative to the line of draft.

6. In a tandem draft connection, a machine frame, a traction wheel mounted in said frame, a draft tongue pivotally connected with said frame and adapted to swing laterally relative thereto, means for controlling a swinging movement of said tongue, said means being mounted upon said frame near the axis of said wheel, and a draft link having the front end thereof pivotally connected with said frame in line with the axis of said wheel and adapted to swing freely laterally relative to the line of draft.

In testimony whereof I affix my signature, in the presence of two witnesses.

CHARLES PEARSON.

Witnesses:
RAY PATTISON,
R. W. MARTIN.